(12) United States Patent
Yu et al.

(10) Patent No.: US 12,511,394 B2
(45) Date of Patent: Dec. 30, 2025

(54) ATTACK MITIGATION AT THE FILE SYSTEM LEVEL

(71) Applicant: Dell Products L.P., Round Rock, TX (US)

(72) Inventors: Piers Changyong Yu, Shanghai (CN); Philippe Armangau, Kalispell, MT (US)

(73) Assignee: DELL PRODUCTS L.P., Round Rock, TX (US)

( * ) Notice: Subject to any disclaimer, the term of this patent is extended or adjusted under 35 U.S.C. 154(b) by 212 days.

(21) Appl. No.: 18/366,929

(22) Filed: Aug. 8, 2023

(65) Prior Publication Data
US 2025/0053656 A1   Feb. 13, 2025

(51) Int. Cl.
   *G06F 21/56*   (2013.01)
   *G06F 21/78*   (2013.01)
   *H04L 9/40*    (2022.01)

(52) U.S. Cl.
   CPC .......... *G06F 21/567* (2013.01); *G06F 21/78* (2013.01); *G06F 2221/2141* (2013.01); *H04L 63/1416* (2013.01); *H04L 63/1425* (2013.01); *H04L 63/1441* (2013.01); *H04L 63/145* (2013.01)

(58) Field of Classification Search
   CPC . G06F 21/78; H04L 63/1425; H04L 63/1416; H04L 63/1441; H04L 63/145
   See application file for complete search history.

(56) References Cited

U.S. PATENT DOCUMENTS

| | | | |
|---|---|---|---|
| 10,965,711 B2* | 3/2021 | Schiappa | H04L 63/20 |
| 2010/0169972 A1* | 7/2010 | Kuo | G06F 21/564 |
| | | | 707/E17.001 |
| 2016/0080419 A1* | 3/2016 | Schiappa | H04L 63/1441 |
| | | | 726/1 |
| 2017/0223046 A1* | 8/2017 | Singh | H04L 63/1491 |
| 2019/0238570 A1* | 8/2019 | Mehner | H04L 63/1441 |
| 2019/0297056 A1* | 9/2019 | Chiang | H04L 63/1466 |
| 2021/0152595 A1* | 5/2021 | Hansen | G06F 21/568 |
| 2021/0182397 A1* | 6/2021 | Karnik | H04W 12/122 |
| 2022/0156396 A1* | 5/2022 | Bednash | G06F 21/554 |
| 2023/0328086 A1* | 10/2023 | Kapoor | H04L 63/1425 |

* cited by examiner

*Primary Examiner* — Ellen Tran
(74) *Attorney, Agent, or Firm* — Amin, Turocy & Watson, LLP

(57) ABSTRACT

Architectures and techniques are described that can provide file system level attack mitigation techniques for a data storage service system or other network service system. By operating at a file system level, the disclosed techniques can access information that is unavailable at the block volume level and which can be leveraged to accurately identify a source of a potential attack. By accurately identifying a source of the potential attack, additional options are available for mitigating the potential attack.

20 Claims, 10 Drawing Sheets

ATTACK MITIGATION AT THE FILE SYSTEM LEVEL

BACKGROUND

Providers of network services, such as data storage or data warehousing, seek to provide a high level of service to customers and/or clients. For example, such providers attempt to ensure that a customer's data is reliably and securely stored and that availability of the customer's data is consistently maintained. A challenge that confronts storage service providers or other network service providers is the potential for malicious actors to interfere in some way with the network service. A common example in the context of data storage services is known as a ransomware attack, which leverages malicious software that seeks to encrypt customer data, rendering such data inaccessible to the customer unless a ransom is paid.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
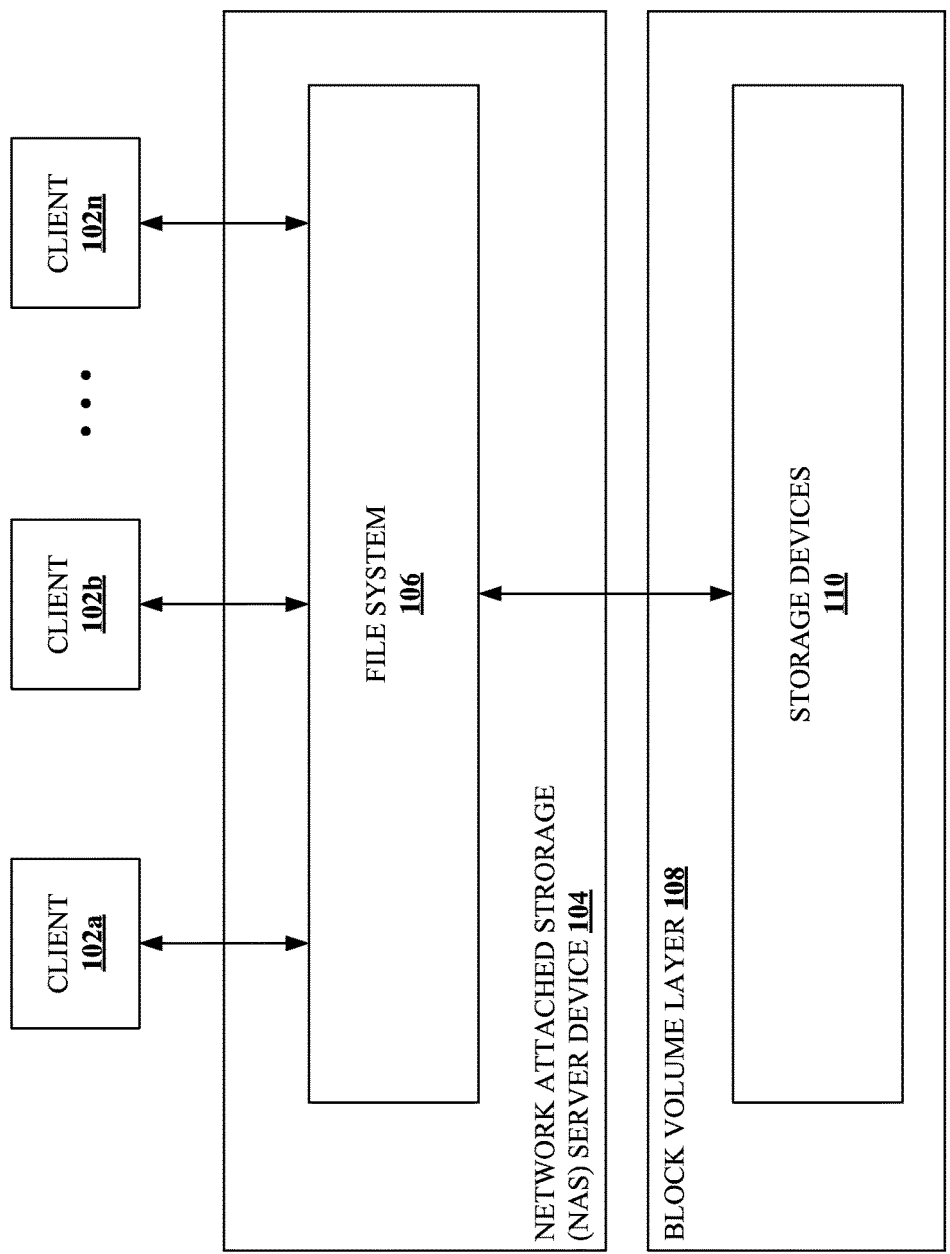
FIG. 1 depicts a schematic block diagram 100 illustrating an example data storage service system or architecture in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

To better explain the disclosed techniques, it can be instructive to consider an example data storage service architecture. FIG. 1 depicts a schematic block diagram 100 illustrating an example data storage service architecture in accordance with certain embodiments of this disclosure. Typically, customer data can be stored in storage devices 110, which can conceptually represent devices of a data storage facility or the like. Commonly, this data is stored according to a block volume architecture (e.g., block volume layer 108), which can provide several advantages for data storage, particularly in the case of large scale operations.

Additionally, the architecture can include a network attached storage (NAS) service device 104. The NAS server device 104 can serve files for clients 102, such as clients 102a, 102b, and 102n, where n can be any suitable whole number. NAS server device 104 can be a file-level device and can include file system 106. File system 106 can communicate according to any suitable protocol. As examples, file system 106 can be a network file system (NFS) protocol, a server message block (SMB) protocol, a secure file transfer protocol (SFTP), a common Internet file system (CIFS) protocol, or another suitable protocol.

It is to be appreciated that each client 102 can operate according to any one of many different file system protocols of their own, so NAS server device 104 can accommodate access to resources of file system 104 regardless of the particular file system protocol used by clients 102.

Figure 2:
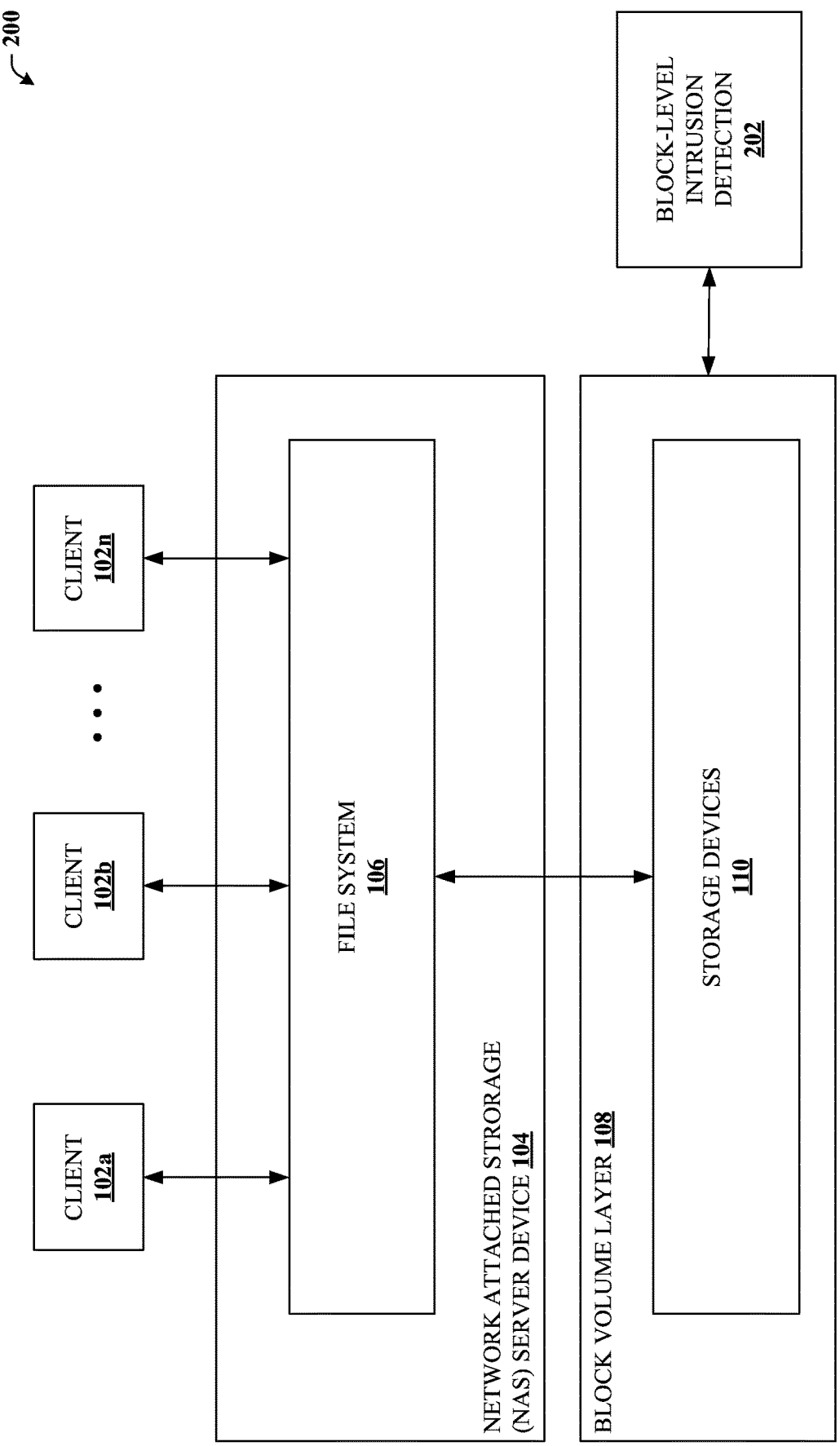
FIG. 2 depicts a schematic block diagram 200 illustrating an example block-level intrusion detection system for the data storage service in accordance with certain embodiments of this disclosure.

Turning now to FIG. 2, a schematic block diagram 200 is depicted illustrating an example block-level intrusion detection system for the data storage service in accordance with certain embodiments of this disclosure. In view of the potential for ransomware attacks or other attacks, providers of data storage services have endeavored to construct intrusion detection systems. One such system is illustrated here as block-level intrusion detection system 202.

However, when a user file system (e.g., file system 106) is built upon a volume (e.g., block volume layer 108), the detection of ransomware or other malicious attacks may be possible in an on-line fashion, yet at the block level the detection system 202 cannot specifically identify the possible intruders, since more than one client 102 can access a given file resource through different file system protocols.

In other words, the level of granularity of the data available at the block level may be sufficient to detect that an attack is occurring in real time, but not sufficient to specifically identify the source of the attack. As a result, when an attack is detected at the block level, the only mechanism for mitigating the attack is to bring the entire volume offline. Bringing the entire volume offline can affect accessibility for all clients 102, not merely the malicious actor(s) responsible for the attack, which can lead to customer dissatisfaction.

In order to overcome these difficulties, the disclosed subject matter is directed to improved techniques for mitigating ransomware attacks or other malicious attacks. In addition to online detection of potential attacks (e.g., in real time or as they are occurring), the disclosed techniques can have access to information necessary to identify the potential attackers. Thus, mitigation techniques can be improved by, e.g., blocking the attackers rather than taking the entire volume offline, as was the case for previous approaches.

To effectuate the disclosed approach, intrusion detection can be implemented at the file system level, where more granular data is available than at the block volume level. In order to enable file system level detection, file system 106 can be expanded to include a common layer that can be leveraged by intrusion detection/mitigation systems as well as other, different systems to better effectuate their own goals, which is further detailed in connection with FIG. 3 below.

Example Systems

Figure 3:
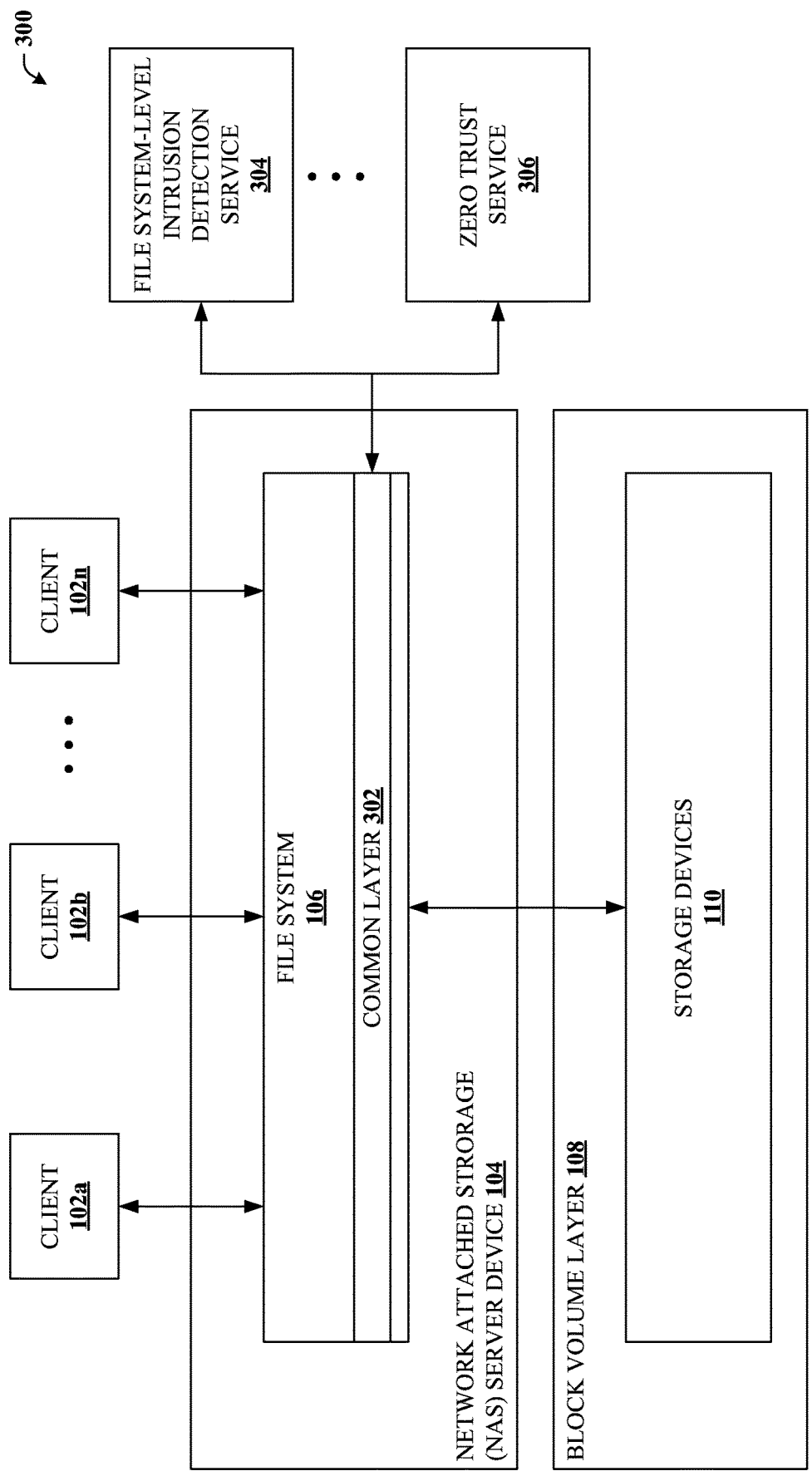
FIG. 3 depicts a schematic block diagram 300 illustrating an example system that can provide file system-level intrusion detection in accordance with certain embodiments of this disclosure.

Referring now to FIG. 3, a schematic block diagram 300 is depicted illustrating an example system that can provide file system-level intrusion detection in accordance with certain embodiments of this disclosure. As noted, previous approaches were directed to block-level detection, the previous approaches are unable to identify a source of the intrusion/attack and therefore are left with no other choice but to bring the entire volume offline in order to mitigate the attack.

In contrast, the disclosed approach can provide both detection and mitigation at the file level. As a result, the detection aspects can specifically identify the source of the intrusion/attack and the mitigation aspects can employ techniques that are unavailable to block-level systems, such as blocking a specific client ID or IP address associated with the ransomware attack or other attack rather than bringing the entire volume offline.

In some embodiments, file system 106 can be expanded to include common layer 302. Common layer 302 can be leveraged by file system level intrusion detection service 304 to obtain very specific information that can be utilized to detect potential attacks as well as identifying the specific source(s) of the attack to provide more robust or efficient ways of mitigating the potential attacks.

Moreover, common layer 302 can be leveraged by other systems or services such as a zero trust service 306 or another suitable system or service. Hence, by building common layer 302 into file system 106, shared access can be provided for many different, potentially orthogonal, systems or services that can benefit from information that is typically only available at the file system level. Zero trust service 306 is merely one non-limiting example with which common layer 302 can provide shared access. Zero trust (ZT) is a cyber security approach that focuses on users, assets, and resources. Conceptually, ZT has as central idea that trust or authorization is never granted implicitly, therefore a goal is to continuously verify network activity. As such, it can be readily appreciated that zero trust service 306 can be benefited by shared access to common layer 302, where access or authorization to file system resources can be initially received.

In some embodiments, common layer 302 can be built into file system 106 or otherwise provided by way of a shared library that can be available to many different products or solutions of the NAS server device 104 such as intrusion detection service 304, zero trust service 306, or others. As such, common layer 302 can be accessed via application programming interfaces (APIs). For example, consider the following two APIs:

(1) Bool IsUserAllowed(uid_t UID)
(2) Void CollectStats(uid_t UID, StatsInfo stats)

A given NAS server device 104 product or service could call the first API to decide whether a given user (e.g., client 102) is allowed to proceed with an I/O transaction. If allowed, the second API can be called at some appropriate time to collect transaction details that can be used for attack detection Referring now to FIG. 4, a schematic block diagram is depicted illustrating an example device 400 that can provide intrusion or attack mitigation at the file system level in accordance with certain embodiments of this disclosure. In some embodiments, device 400 can be, or can be included in or communicatively coupled to, a network attached storage (NAS) device, such as NAS server device 104. Device 400 can comprise a processor 402 that, potentially along with attack mitigation device 406, can be specifically configured to perform functions associated with mitigating potential attacks such as ransomware attacks. Device 400 can also comprise memory 404 that stores executable instructions that, when executed by processor 402, can facilitate performance of operations. Processor 402 can be a hardware processor having structural elements known to exist in connection with processing units or circuits, with various operations of processor 402 being represented by functional elements shown in the drawings herein that can require special-purpose instructions, for example, stored in memory 404 and/or attack mitigation device 406. Along with these special-purpose instructions, processor 402 and/or attack mitigation device 406 can be a special-purpose device. Further examples of the memory 404 and processor 402 can be found with reference to FIG. 10. It is to be appreciated that device 400 or computer 1002 can represent a server device or a client device of a network or network services platform and can be used in connection with implementing one or more of the systems, devices, or components shown and described in connection with FIG. 4 and other figures disclosed herein.

In some embodiments, device 400 can be embodied as a device of file system-level intrusion detection service 304, as detailed in FIG. 3. In some embodiments, device 400 can comprise, be included in, or be communicatively coupled to a NAS server such as NAS server device 104 as previously detailed in connection with FIGS. 1-3.

At reference numeral 408, device 400 can interface with file system 106. Such interfacing can be via common layer 302. As such, attack mitigation can be performed at the file system level with access to file system type data, which can be leveraged to improve attack mitigation aspects.

For example, at reference numeral 410, device 400 can receive transaction data 412. Transaction data 412 can be indicative of access (e.g., some I/O transaction) to a file system resource by a certain client (e.g., client 102a) of the multiple client devices 102. It is understood that transaction data 412 can be collected or sampled over defined periods of time and can be organized on a per-client 102 basis in some embodiments. In some embodiments, transaction data 412 can be received in response to an API call to common layer 302, such as the second example API call indicated previously in connection with FIG. 3.

Figure 4:
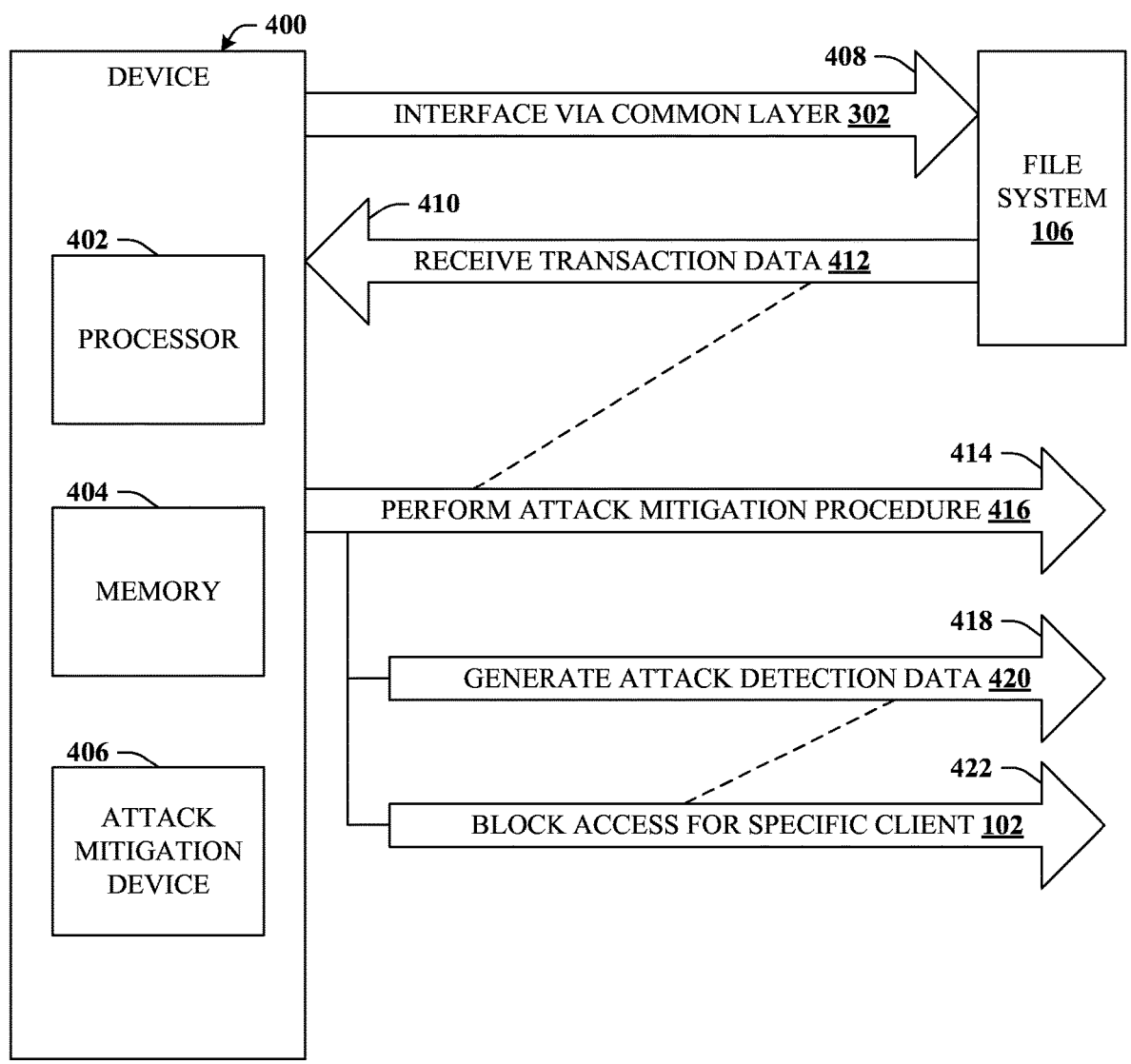
FIG. 4 depicts a schematic block diagram illustrating an example device 400 that can provide intrusion or attack mitigation at the file system level in accordance with certain embodiments of this disclosure.
Figure 5:
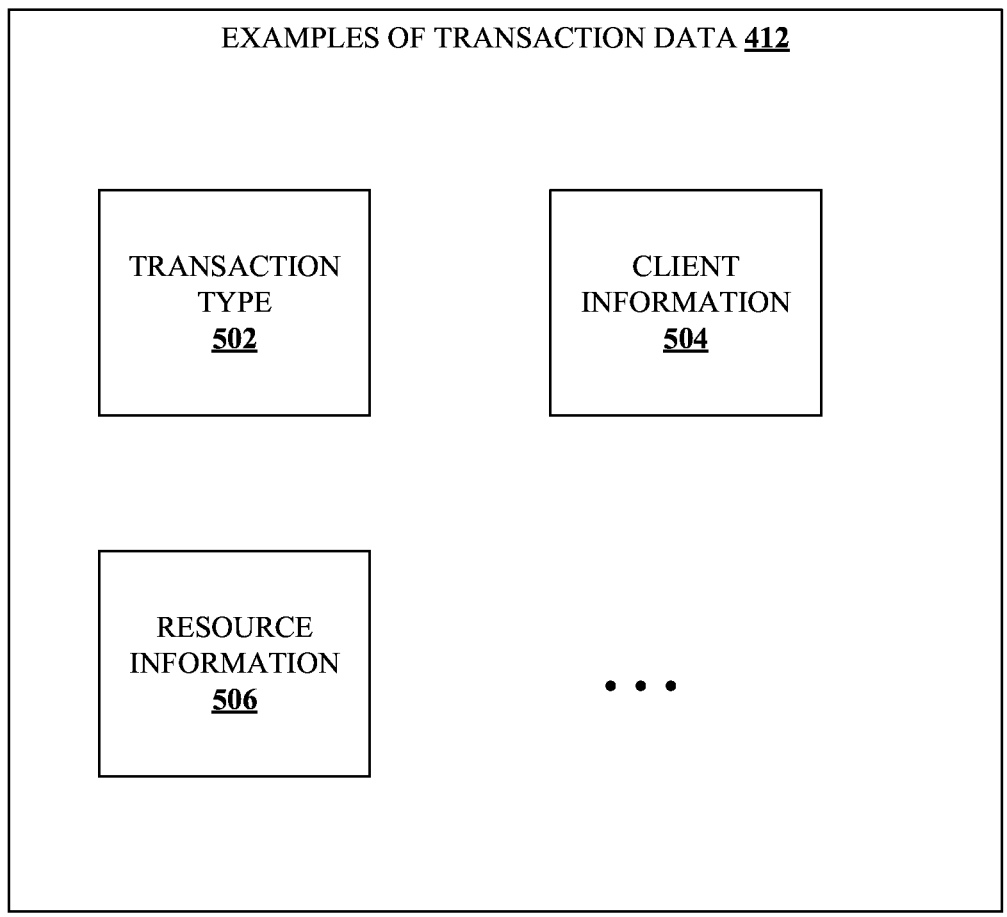
FIG. 5 depicts a schematic block diagram 500 illustrating various examples of transaction data 412 in accordance with certain embodiments of this disclosure.

While still referring to FIG. 4, but turning now as well to FIG. 5, a schematic block diagram 500 is depicted illustrating various examples of transaction data 412 in accordance with certain embodiments of this disclosure. For instance, in some embodiments, transaction data 412 can include a transaction type 502. The transaction type 502 can be, for example, a create transaction, a rename transaction, a delete transaction, or another transaction type requested by a given client 102.

In some embodiments, transaction data 412 can also include various client information 504 associated with the specified client 102, such as, for instance, a client ID associated with the client 102 that is available at the file system level, an IP address associated with the client 102 that is available at the file system level, or another suitable reference or identifier of client 102.

In some embodiments, transaction data 412 can include resource information 506. Resource information 506 can include information describing the resource (e.g., a file name, path, or the like) being accessed by the client 102 request as well as certain state or historical information regarding the resource such as, e.g., a time since the resource was last accessed or "touched". Transaction data 412 can include other types of suitable information in addition to the examples listed above or otherwise herein.

Continuing the discussion of FIG. 4, at reference numeral 414, device 400 can perform attack mitigation procedure 416. Attack mitigation procedure 416 can be configured to mitigate, at a file system level, attacks against the NAS device or block volume data devices, which can include operations indicated by reference numerals 418 and 422 as well as other operations detailed herein. Attack mitigation procedure 416 can leverage transaction data 412 in order to detect and/or mitigate potential attacks and/or intrusions, such as ransomware attacks.

At reference numeral 418, device 400 can generate attack detection data 420. Attack detection data 420 can be generated based on a statistical analysis of transaction data 412 or another suitable analysis of transaction data 412, some of which may typically only be available at the file system level. If attack detection data 420 indicates that an attack is potentially occurring from a specific client 102, then at reference numeral 422, device 400 can block access by that specific client 102 according to a configurable policy. Additional detail relating to the generation of detection data 420 and blocking access according to a configurable policy are provided in connection with FIG. 6.

Figure 6:
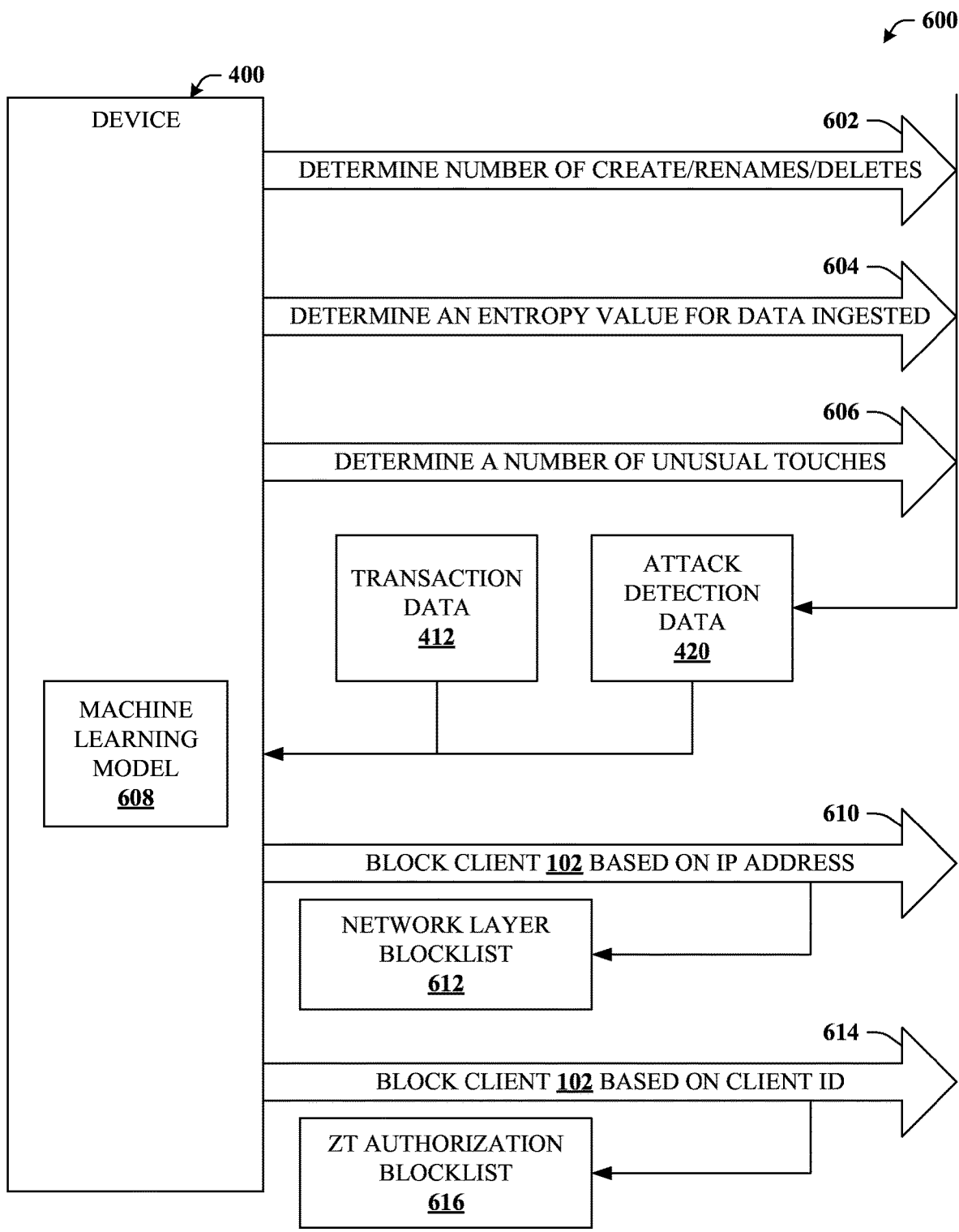
FIG. 6 depicts a schematic block diagram 600 illustrating additional aspects or elements of device 400 relating to intrusion or attack mitigation at the file system level in accordance with certain embodiments of this disclosure.

With reference now to FIG. 6, a schematic block diagram 600 is depicted illustrating additional aspects or elements of device 400 relating to intrusion or attack mitigation at the file system level in accordance with certain embodiments of this disclosure. Generally, FIG. 6 relates to additional detail regarding attack mitigation procedure 416 of FIG. 4. In that regard, reference numerals 602-606 relate to additional detail of attack detection data 420 that was generated in connection with reference numeral 418 of FIG. 4 and reference numerals 610-616 relate to additional detail regarding blocking a specific client 102 according to various techniques (which can be configured according to business rules or a policy) if it is determined that an attack is occurring from the specific client 102.

At reference numeral 602, device 400 can a determine a number of the various transaction types 502 that are requested by a specific client 102, which can be based on an analysis of transaction data 412 over a defined period of time. Hence, for example, device 400 can determine a count or a ratio/percentage of any or all of the various transaction types 502 such as create transactions, rename transactions, or delete transaction requested by the specific client 102. This data can be used to identify potential attacks, as further detailed herein.

At reference numeral 604, device 400 can determine an entropy value for data ingested from the specific client 102. The entropy value can be a representation of a degree of randomness associated with the data ingested from the specific client 102. In that regard, data ingested with a high degree of randomness can be an indicator of a potential attack.

At reference numeral 606, device 400 can determine a number of unusual touches, which can relate to transactions by the specific client 102 that involve files of file system 106 (or another file system resource) that have not been accessed or touched for more than a threshold period of time. Such can be determined based on client information 506 detailed in connection with FIG. 5. The threshold period can be configurable according to implementation and can be indicative of an amount of time beyond which an access to the particular file or resource is unlikely to occur under normal circumstances. Thus, a high number of unusual touches can be indicative of a potential attack.

Information from reference numerals 602-606 can be generated and stored as attack detection data 420. Attack detection data 420, potentially along with transaction data 412 can then be analyzed to identify threats. In some embodiments, analysis of attack detection data 420 and transaction data 412 can be performed by a machine learning model 608 that can be trained to identify various many different types of specific attacks, including, for example, ransomware attacks.

Once it is determined that behavior of a specific client 102 does represent a threat or attack, further transactions by that specific client 102 can be blocked according to a configurable policy, as indicated at reference numeral 422 of FIG. 4. It is understood that because the attack mitigation elements of the disclosed subject matter operate at the file system level rather than the block system level, certain information is available relating to the identity of the specific client (e.g., the source of the attack) that is not available to block level approaches.

Namely, both a client ID and a client IP address are available at the file system level, which can therefore be used to provide different techniques for blocking the specific client 102. For instance, at reference numeral 610, device 400 can facilitate blocking the specific client 102 based on an IP address of the specific client 102. Additionally, or alternatively, at reference numeral 614, device 400 can facilitate blocking the specific client 102 based on a client ID of the specific client 102.

The particular attack mitigation approach can be based on the aforementioned configurable policy and thus can be a result of a business decision or based on implementation. If the first approach is selected that blocks the specific client 102 based on IP address, then a first attack mitigation approach can be employed that adds the IP address (of the specific client 102 determined to be a source of the attack) to a network layer blocklist 612. As a result, subsequent transactions or requests from that particular IP address can be blocked at a network layer of the NAS.

If the second approach is selected that blocks the specific client 102 based on client ID, then a second attack mitigation approach can be employed that adds the client ID (e.g., a user identity) of the specific client 102 determined to be a source of the attack to a zero trust blocklist 616. As a result, subsequent transactions or requests from that particular user identity can be blocked during an authorization process of an associated zero trust system, architecture, or policy.

Example Methods

Figure 7:
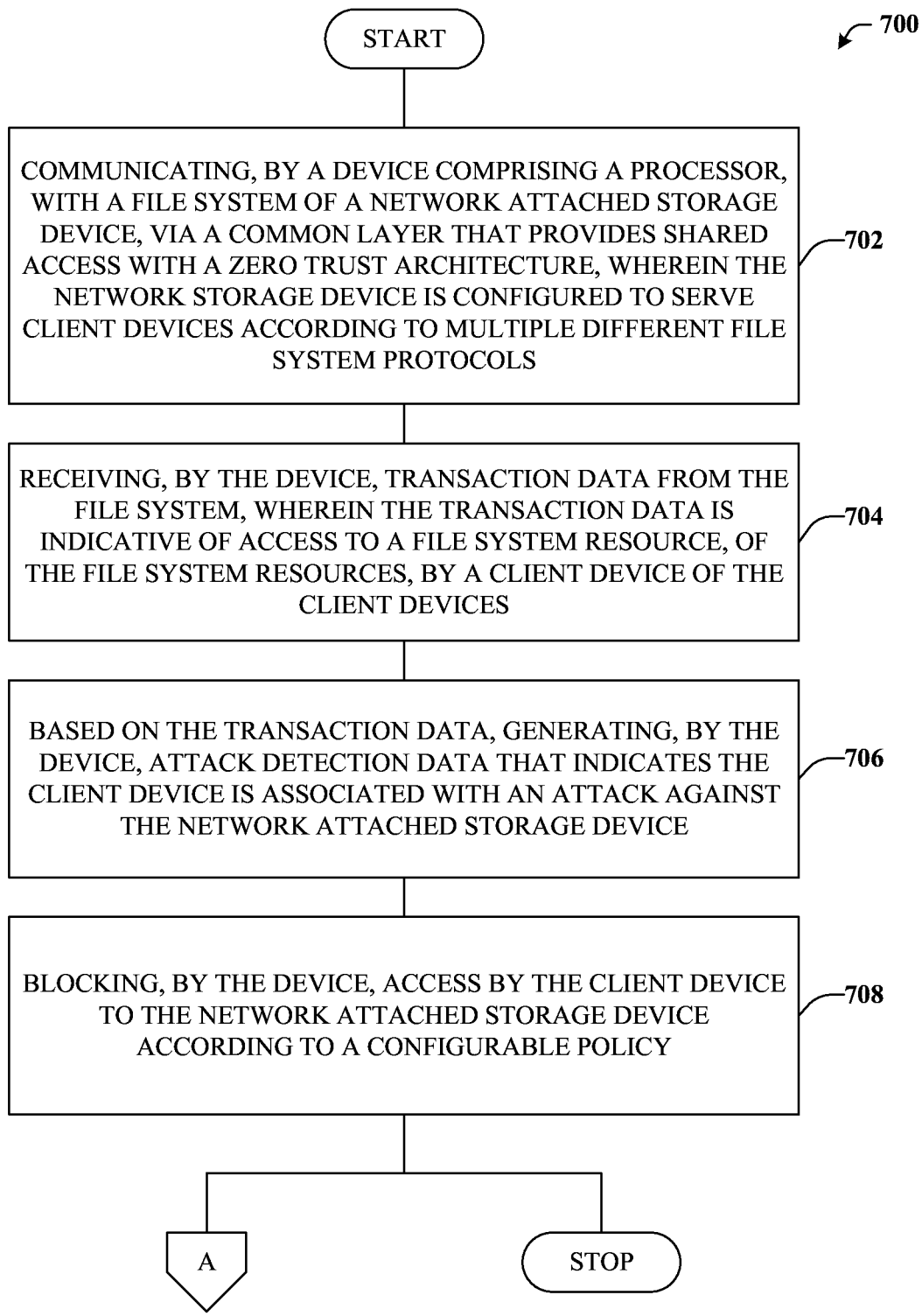
FIG. 7 illustrates an example method that can provide intrusion or attack mitigation at the file system level in accordance with certain embodiments of this disclosure.
Figure 8:
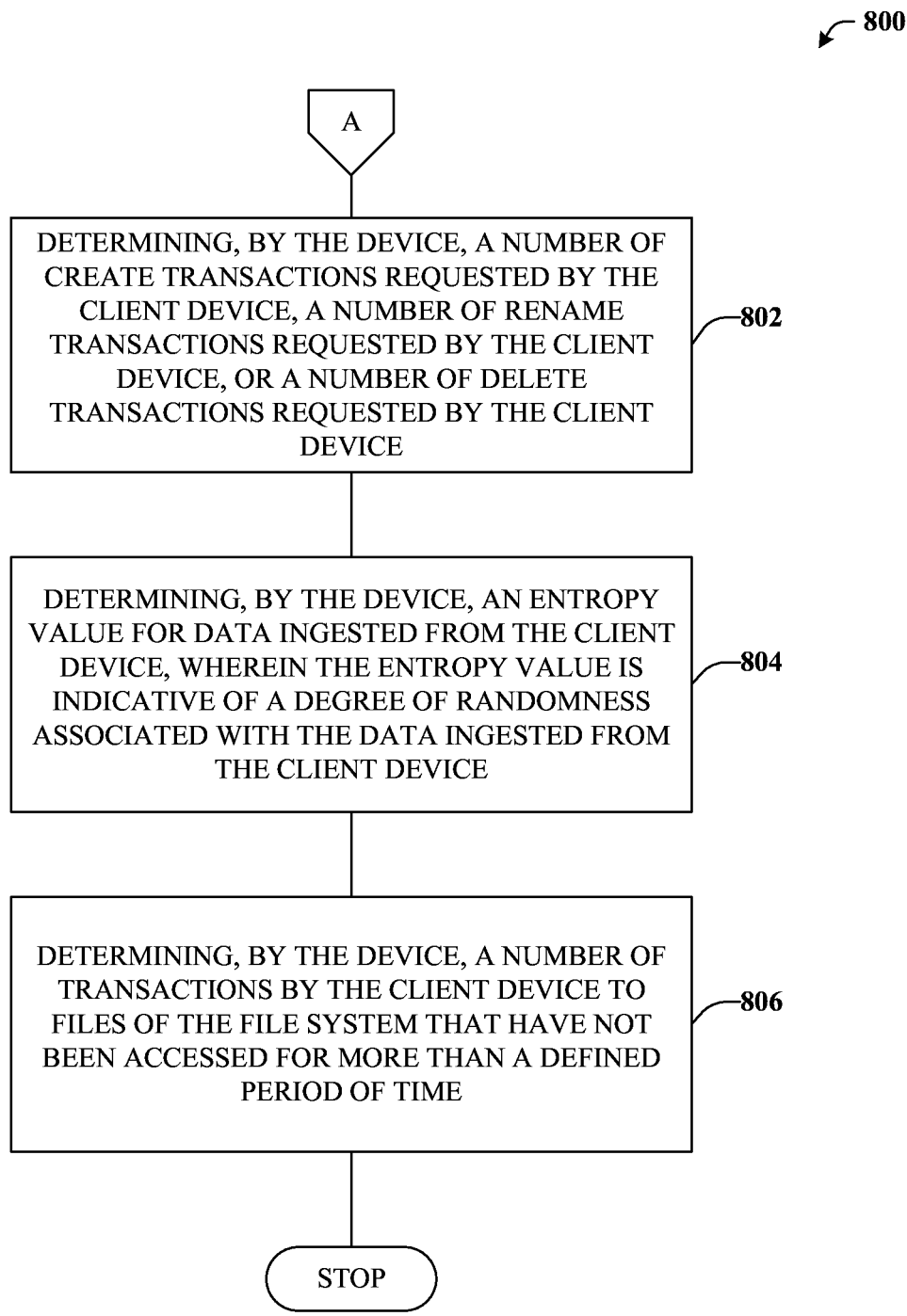
FIG. 8 illustrates an example method that can provide for additional aspect or elements in connection with intrusion or attack mitigation at the file system level in accordance with certain embodiments of this disclosure.

FIGS. 7 and 8 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored in an article of manufacture to facilitate transporting and transferring such methods to computers.

Referring now to FIG. 7, exemplary method 700 is depicted. Method 700 can provide intrusion or attack mitigation at the file system level in accordance with certain embodiments of this disclosure. While method 700 describes a complete method, in some embodiments, method 700 can include one or more elements of method 800, as illustrated by insert A.

At reference numeral 702, a device comprising a processor can communicate with a file system of a network attached storage device. Said communication can be via a common layer that provides shared access with other systems or devices such as a zero trust architecture system or device. In some embodiments, the network storage device can be configured to serve client devices according to multiple different file system protocols. In other words, the client devices may use any one of many different files system protocols to access a device, service, or resource provided by the network attached storage device.

At reference numeral 704, the device can receive transaction data from the file system. In some embodiments, the transaction data can be indicative of access to a file system resource, of the file system resources, by a client device of the client devices. In some embodiments, transaction data can be sampled or collected over a configurable period of time.

At reference numeral 706, based on the transaction data received at reference numeral 704, the device can generate attack detection data. The attack detection data can then be analyzed to determine whether client device is associated with an attack against the network attached storage device or other associated devices. If no threat is found, then no further attack mitigation action need be taken and method 700 can scan other transaction data samples or terminate. On the other hand, if a threat is detected, the method 700 can take further attack mitigation action, which is indicated at reference numeral 708.

At reference numeral 708, the device can block access by the client device to the network attached storage device. Said blocking can be according to a configurable policy that can, for example, determine a manner or mechanism to employ to block subsequent transactions or request from that client. By way of example, according to a first approach, the device can facilitate blocking based on an IP address associated with the client. According to a second approach, the device can facilitate blocking based on a client ID or user identity associated with the client. Method 700 can terminate or, in some embodiments, proceed to insert A, which is further detailed in connection with FIG. 8.

Turning now to FIG. 8, exemplary method 800 is depicted. Method 800 can provide for additional aspect or elements in connection with intrusion or attack mitigation at the file system level in accordance with certain embodiments of this disclosure.

At reference numeral 802, the device introduced at reference numeral 702 comprising a processor can determine certain statistical information associated with I/O transaction of the client. For example, the device can determine a number of create transactions requested by the client device, a number of rename transactions requested by the client device, a number of delete transactions requested by the client device, or another suitable number or ratio associated with different I/O transaction types.

At reference numeral 804, the device can determine an entropy value for data ingested from the client device. The entropy value can be indicative of a degree of randomness associated with the data ingested from the client device. Such information can be indicative of certain types of threats or attacks.

At reference numeral 806, the device can determine a number of transactions by the client device to files of the file system that have not been accessed for more than a defined period of time. Likewise, this information can be indicative of certain types of threats or attacks.

Example Operating Environments

Figure 9:
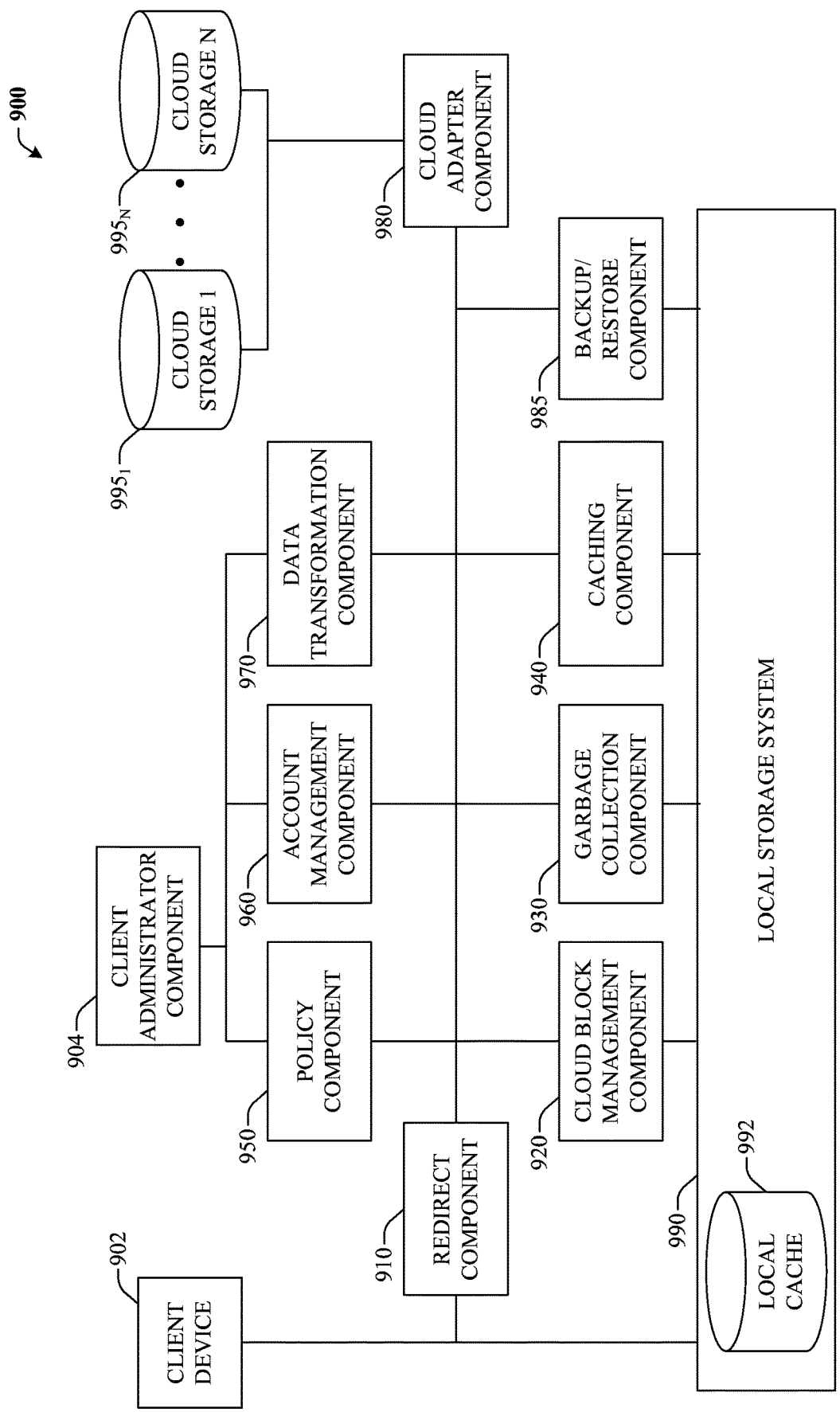
FIG. 9 illustrates a block diagram of an example distributed file storage system that employs tiered cloud storage in accordance with certain embodiments of this disclosure.
Figure 10:
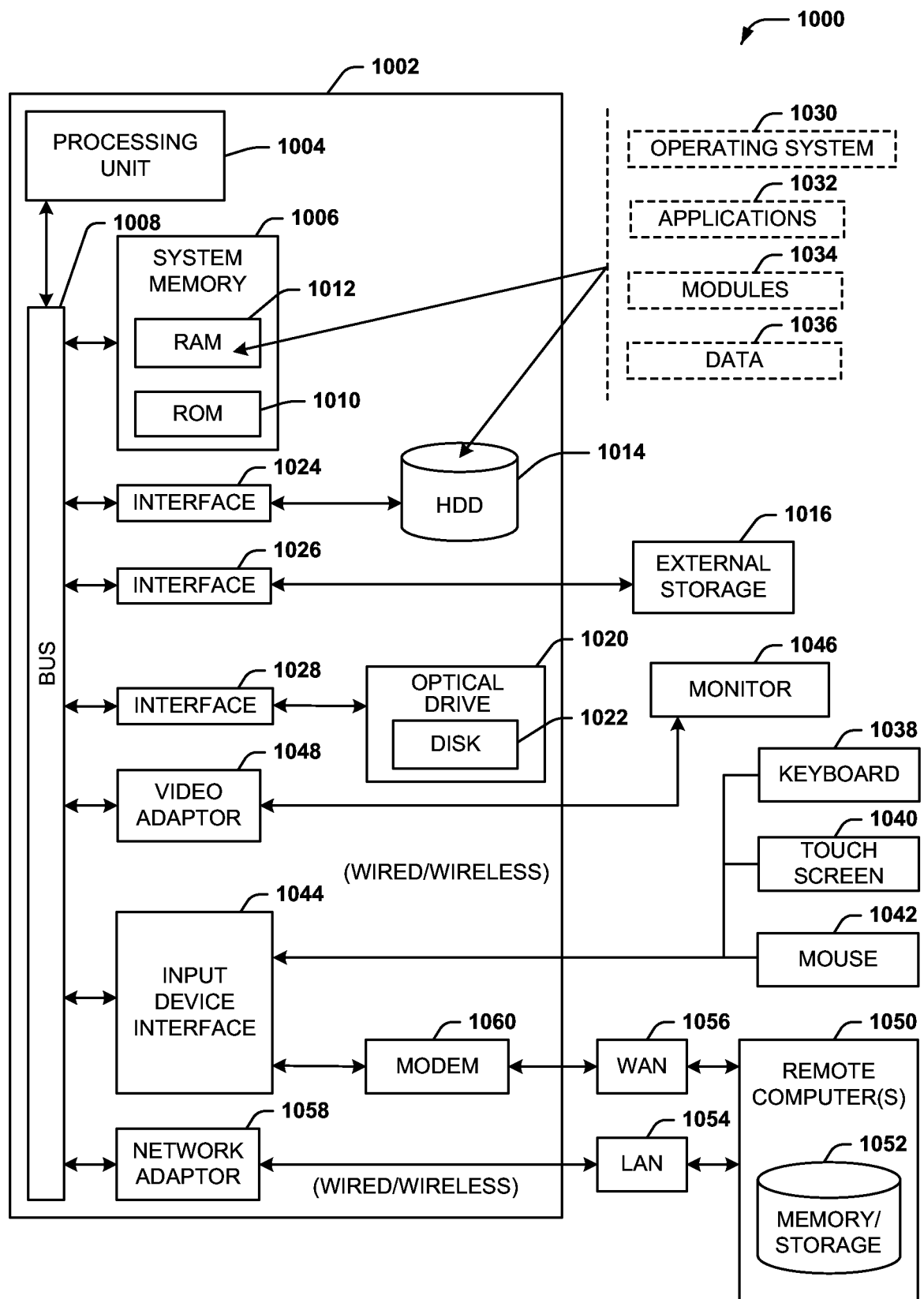
FIG. 10 illustrates an example block diagram of a computer operable to execute certain embodiments of this disclosure.

To provide further context for various aspects of the subject specification, FIGS. 9 and 10 illustrate, respectively, a block diagram of an example distributed file storage system 900 that employs tiered cloud storage and block diagram of a computer 1002 operable to execute the disclosed storage architecture in accordance with aspects described herein.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well.

As more fully described below with respect to redirect component 910, redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 may use an interface to access the policy component 950 and the account management component 960 for operations as more fully described below with respect to these components. Data transformation component 970 can operate to provide encryption and compression to files tiered to cloud storage. Cloud adapter component 980 can be in communication with cloud storage 1 995$_1$ and cloud storage N 995$_N$, where N is a positive integer. It can be appreciated that multiple cloud storage locations can be used for storage including multiple accounts within a single cloud storage location as more fully described in implementations of this disclosure. Further, a backup/restore component 985 can be utilized to back up the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 960 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on list of mappings it manages. For example, each stub can be associated with an account, and the cloud block management component 920 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of APIs. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 940 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 985 can transfer a copy of the files within the local storage system 990 to another cluster (e.g., target cluster). Further, the backup/restore component 985 can manage synchronization between the local storage system 990 and the other cluster, such that, the other cluster is timely updated with new and/or modified content within the local storage system 990.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device storing file system level mitigation techniques data, comprising:
   at least one processor; and
   at least one memory that stores executable instructions that, when executed by the at least one processor, facilitate performance of operations, comprising:
   interfacing with a file system of a network attached storage (NAS) server device that includes an expanded file system comprising a common layer utilized by an intrusion detection system, a mitigation system, multiple application program interfaces (API), and other systems that utilize multiple different file system protocols to implement a zero trust architecture, wherein trust or authorization is never granted implicitly and network activity is continuously verified;

via an API, the common layer collecting transaction data, indicative of access to a file system resource, of file system resources, by a client device of client devices; and performing an attack mitigation procedure via analysis of transaction data received via the common layer of the file system, attacks against the NAS server device, the attack mitigation procedure comprising:

generating, from the transaction data, attack detection data that indicates the client device is associated with an attack against the NAS server device; and blocking access by the client device to the NAS server device according to a configurable policy.

2. The device of claim 1, wherein the file system of the NAS server device is configured to validate access to the file system resource in accordance with a zero trust policy that leverages the shared access of the common layer.

3. The device of claim 1, wherein the multiple different file system protocols comprise at least one of: a network file system protocol, a server message block protocol, a secure file transfer protocol, or a common Internet file system.

4. The device of claim 1, wherein the transaction data comprises a transaction type associated with the access, and wherein the transaction type is selected from a group comprising at least one of: a create transaction, a rename transaction, and a delete transaction.

5. The device of claim 1, wherein the generating of the attack detection data comprises determining a number of create transactions requested by the client device, determining a number of rename transactions requested by the client device, or determining a number of delete transactions requested by the client device.

6. The device of claim 1, wherein the generating of the attack detection data comprises determining an entropy value for data ingested from the client device, and wherein the entropy value is indicative of a degree of randomness associated with the data ingested from the client device.

7. The device of claim 1, wherein the generating of the attack detection data comprises determining a number of transactions by the client device relating to files of the file system that have not been accessed for more than a defined period of time.

8. The device of claim 1, wherein the attack mitigation procedure further comprises utilizing a machine learning model that uses, as input, at least one of the transaction data or the attack detection data and outputs a determination of whether the client device is associated with the attack against the network attached storage device.

9. The device of claim 1, wherein the configurable policy is in a state configured to block access according to an IP address of the client device.

10. The device of claim 9, wherein the blocking of the access by the client device comprises adding the IP address of the client device to an IP address blocklist configured to reject requests from the IP address at a network layer of the network attached storage.

11. The device of claim 1, wherein the configurable policy is in a state configured to block the access according to a user identity of the client device.

12. The device of claim 11, wherein the blocking of the access by the client device comprises adding the user identity of the client device to a user blocklist configured to reject requests associated with the user identity during an authorization process of the zero trust policy.

13. A non-transitory computer-readable medium for mitigating file system level attack comprising instructions that, in response to execution, cause a system comprising at least one processor to perform operations, comprising:

at a network attached storage (NAS) server device expanding the file system to include a common layer utilized by an intrusion detection system, a mitigation system, multiple application program interfaces (API) as well as other systems that utilize multiple different file system protocols to implement a zero trust architecture in which trust or authorization is not granted implicitly and network activity is continuously verified;

the common layer collecting, via an API, transaction data, wherein the transaction data is indicative of access to the resource of the file system by a client device of client devices;

based on the transaction data received via the common layer of the file system, generating, by an attack mitigation service on the NAS server device, attack detection data that indicates the client device is associated with an attack against the NAS server device; and blocking, by the attack mitigation service on the NAS server device, access by the client device to the NAS server device according to a configurable policy.

14. The non-transitory computer-readable medium of claim 13, wherein the transaction data comprises a transaction type associated with the access, and wherein the transaction type is selected from a group comprising at least one of: a create transaction, a rename transaction, and a delete transaction.

15. The non-transitory computer-readable medium of claim 13, wherein the configurable policy is in a state configured to block the access according to an IP address of the client device, and wherein the blocking of the access by the client device comprises adding the IP address of the client device to an IP address blocklist configured to reject requests from the IP address at a network layer of the network attached storage.

16. The non-transitory computer-readable medium of claim 13, wherein the configurable policy is in a state configured to block the access according to a user identity of the client device, and wherein the blocking of the access by the client device comprises adding the user identity of the client device to a user blocklist configured to reject requests from the user identity during an authorization process performed in accordance with the zero trust architecture.

17. A method for mitigating file system level attacks, comprising:

at a network attached storage (NAS) server device expanding the file system to include a common layer utilized by an intrusion detection system, a mitigation system, multiple application program interfaces (API) and other systems that utilize multiple different file system protocols to implement a zero trust architecture, wherein trust or authorization is never granted implicitly and network activity is continuously verified;

the common layer collecting, via an API, transaction data, wherein the transaction data is indicative of access to a file system resource, of the file system resources, by a client device of client devices;

based on the transaction data received via the common layer of the file system, generating, by an attack mitigation service on the NAS server device, attack detection data that indicates the client device is associated with an attack against the NAS server device; and blocking, by the attack mitigation service on the NAS server device, access by the client device to the NAS server device according to a configurable policy.

18. The method of claim 17, further comprising determining, by the device, a number of create transactions requested by the client device, a number of rename transactions requested by the client device, or a number of delete transactions requested by the client device.

19. The method of claim 17, further comprising determining, by the device, an entropy value for data ingested from the client device, wherein the entropy value is indicative of a degree of randomness associated with the data ingested from the client device.

20. The method of claim 17, further comprising determining, by the device, a number of transactions by the client device to files of the file system that have not been accessed for more than a defined period of time.

* * * * *